S. D. BROOKS.
VEHICLE WHEEL.
APPLICATION FILED FEB. 4, 1910.
1,000,322.
Patented Aug. 8, 1911.
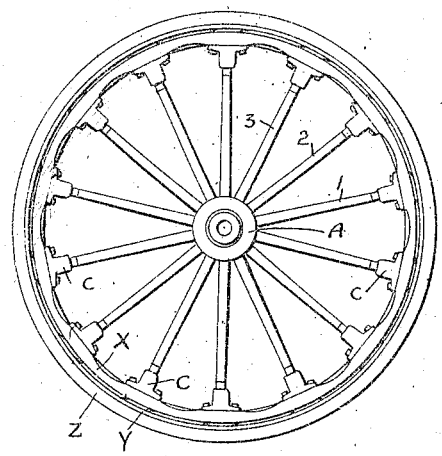
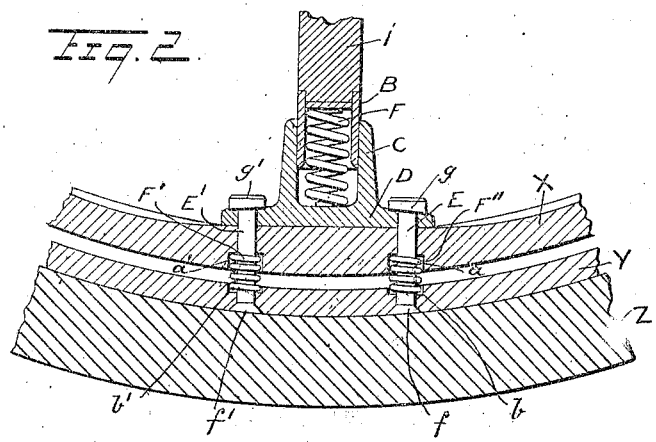
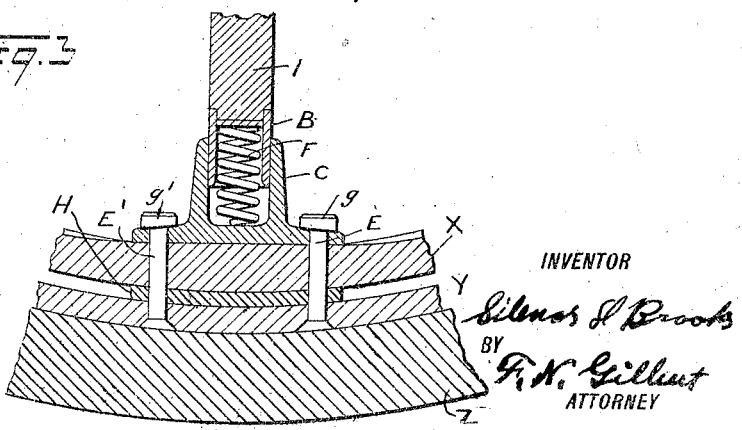

UNITED STATES PATENT OFFICE.

SILENUS D. BROOKS, OF ONEONTA, NEW YORK, ASSIGNOR TO CHARLES N. MURDOCK, OF ONEONTA, NEW YORK.

VEHICLE-WHEEL.

1,000,322. Specification of Letters Patent. Patented Aug. 8, 1911.

Application filed February 4, 1910. Serial No. 542,154.

*To all whom it may concern:*

Be it known that I, SILENUS D. BROOKS, a citizen of the United States, residing at Oneonta, in the county of Otsego and State of New York, have invented certain new and useful Improvements in Vehicle-Wheels, of which the following is a specification.

My invention relates to improvements in flexible or spring tires for wagons, automobiles or other wheel vehicles.

The objects of my invention are to provide a durable but flexible spring tire and rim for wheels of carriages, automobiles and other wheel vehicles, and to produce a spring yielding surface for the wheel rim without the use of a pneumatic tube or tire. I attain these objects by the mechanism herein described, in which—

Figure 1 is an elevation of my device. Fig. 2 is a vertical section of a portion of the wheel rim, in the preferred form of my invention, and Fig. 3 is a similar view in a modified form of my invention.

Similar letters refer to similar parts throughout the several views.

In my device, A represents the ordinary hub of a wheel, having mounted upon it the spokes 1, 2, 3, etc. On the end of each spoke I mount the metallic ferrule B. On the interior rim, X of the wheel, and opposite the end of each spoke, I mount a metallic socket, C, having a projecting base D. The base D is held in position by the bolts E and E', having at their outer ends, heads, $f$ and $f'$, which bolts E and E' pass inward through the rim of the wheel, and through the base D, and are surmounted by the cap nuts $g$ or $g'$.

Within the socket C, I mount the coil spring F. On the interior surface of the rim X, I have the chambers $a$ and $a'$ through which the bolts E and E', before mentioned, pass, and on these bolts, E and E' I mount the coil springs F' and F''. Resting upon the coil springs F' and F'', I mount an outer or second wheel rim, Y, which has let into its inner surface, chambers $b$ and $b'$, in which rest the lower ends of coil springs F' and F''. The coil springs form a flexible and yielding support for the wheel rim Y, which is held in place by the bolts E and E'. The bolts E and E' are slidably mounted in ring X, and also in base D, so that whenever pressure is exerted on the wheel the various springs may be contracted, the nuts $g$ and $g'$ projecting beyond the base D. Around the outer rim of the wheel, I mount a solid rubber tire, Z.

In a modified form of my device, as shown in Fig. 3, instead of having the coil springs F' and F'' as yielding bodies between the inner rim X and the outer rim Y of the wheel, I place between the rims sections of rubber or other elastic material, H, which forms a yielding resisting foundation between the two rims.

Having now described my invention, what I claim as new, and for which I desire Letters Patent, is as follows:

1. In a vehicle wheel, a hub, a plurality of spokes mounted in the hub, a tubular member mounted on the outer end of each of said spokes, a rim, a plurality of socket members secured to said rim and telescopically fitting over said tubular members and said spokes, a spring for each of said spokes surrounded by said tubular member and said sockets and adapted to press against the bottom of said sockets and the ends of said spokes, the outer rim normally spaced from said first mentioned rim, a plurality of spaced springs arranged between said rims, and bolts for holding said rims against independent rotary movement, said bolts extending through said springs for holding the same in proper place.

2. In a vehicle wheel, a hub, a plurality of spokes secured thereto, a rim, a spring positioned between the outer end of each of said spokes and said rim, said rim being formed with a plurality of sockets in the periphery thereof, an outer rim formed with a plurality of sockets on the inner periphery thereof and arranged opposite the sockets in the first mentioned rim, a spring arranged to fit into each pair of sockets for resiliently holding said outer rim spaced from said first mentioned rim, and a bolt extending through each of said last mentioned springs, said outer rim and said first mentioned rim, for holding said last mentioned springs in position for preventing any movement of one of said rims independent of the other.

3. In a wheel, a hub, spokes radiating therefrom, a rim at the ends of the spokes, sockets into which the ends of the spokes fit, springs in the said sockets interposed between the spokes and the rim, a second, outer, rim, surrounding the first mentioned rim and spaced therefrom, bolts uniting the sockets to the inner rim and also connecting the two rims and holding them against independent rotative movements, and resilient means interposed between the rims and holding them spaced apart.

In testimony whereof I have affixed my signature, in presence of two witnesses.

SILENUS D. BROOKS.

Witnesses:
NETTIE M. MURDOCK,
D. J. KILKENNY.